United States Patent [19]

Fukunaga et al.

[11] Patent Number: 4,646,073
[45] Date of Patent: Feb. 24, 1987

[54] INPUT-OUTPUT COORDINATE TRANSFORMING METHOD AND APPARATUS FOR INPUT-INTEGRATED DISPLAY

[75] Inventors: Yasushi Fukunaga; Ryo Fujita, both of Hitachi, Japan

[73] Assignee: Hitachi, Ltd., Tokyo, Japan

[21] Appl. No.: 594,687

[22] Filed: Mar. 29, 1984

[30] Foreign Application Priority Data

Apr. 1, 1983 [JP] Japan ................................. 58-55022

[51] Int. Cl.$^4$ .............................................. G09G 3/02
[52] U.S. Cl. .................................... 340/709; 340/707
[58] Field of Search ............... 340/706, 707, 708, 709, 340/710, 711; 178/18

[56] References Cited

U.S. PATENT DOCUMENTS

| | | | |
|---|---|---|---|
| 3,825,746 | 7/1974 | Kendler et al. | 340/707 X |
| 3,838,856 | 10/1974 | Takeya et al. | 340/707 X |
| 3,995,269 | 11/1976 | Schumacher | 340/707 X |
| 4,181,952 | 1/1980 | Casey et al. | 340/709 X |
| 4,413,314 | 11/1983 | Slater et al. | 340/706 X |

Primary Examiner—Gerald L. Brigance
Assistant Examiner—Vincent P. Kovalick
Attorney, Agent, or Firm—Antonelli, Terry & Wands

[57] ABSTRACT

An input-output coordinate transforming method for an input-integerated display apparatus of a structure in which an input coordinate designating part is integrally combined with a screen of a display device, wherein coordinates inputted through the input coordinate designating part by an operator are subjected to coordinate transformation before being supplied to the display device so as to make an input point on the input coordinate designating means coincide with an output point on the display screen when observed by the operator. The method comprises steps of displaying sequentially a plurality of predetermined reference coordinates on the display screen and inputting through the input coordinate designating part the coordinates of points thereon designated by the operator which points correspond, respectively, to the reference coordinate points, arithmetically determining constants of predetermined coordinate transformation expressions representing correspondence between the input coordinates and the output coordinates on the basis of the plurality of the reference coordinates and the plurality of the corresponding input coordinates, and transforming the input coordinates supplied by the input coordinate designating part into output coordinates to be supplied to the display device in accordance with the coordinate transformation expressions containing the constants determined.

6 Claims, 6 Drawing Figures

INPUT-OUTPUT COORDINATE TRANSFORMING METHOD AND APPARATUS FOR INPUT-INTEGRATED DISPLAY

BACKGROUND OF THE INVENTION

The present invention generally relates to an input-integrated display apparatus of a structure in which a coordinate input designating part is integrated with a display screen. More particularly, the invention concerns an input-output coordinate transforming method and apparatus for transforming input coordinates to output coordinates in such a manner that a point inputted by an operator through the input coordinate designating means is caused to coincide with, when viewed by the operator, an output point displayed on the screen in response to the input point.

Heretofore, an instrument referred to as a planar tablet or mouse is made use of as the means for designating a point to be displayed on a screen of a display apparatus. The tablet on which the point to be displayed is designated by operator is provided separately from a display panel. Operator designates a point on the tablet while observing the cursor displayed on the display screen or diverting his eyes from the display screen. This process involves no problem to be mentioned in the case of man-machine communication where only a single point is to be inputted. However, in case a line, i.e. a continuous sequence of points is to be inputted, the operator is compelled to move his hand while holding a stylus pen, followed by observation of a cursor displayed on the display screen for identifying displacement of the cursor on the display screen and subsequently by the movement of the pen, so to say, in a feedback loop. Such procedure in general reguires an increased number of operations, e.g. visual detection or confirmation of the result of the displacement of the operator's hand, which is followed by the visual verification, as in the case of manual drawing of a line. In this case, the hitherto known display apparatus is inconvenient for use. As attempts for overcoming the inconveniences mentioned above, proposals have been made as disclosed in Japanese Patent Laid-Open Publications Nos. 105332/75 and 72282/80. According to the teaching disclosed in Japanese Patent Laid-Open Publication No. 105332/75, a transparent manipulation plate is provided on an image displaying screen of a CRT display apparatus so that operator can observe the image on the display screen of the CRT through the transparent plate. When the operator designates a position on the transparent manipulation plate with a writing pen while observing the image on the display screen, the positional information of the designated point is supplied to the CRT to be displayed on the screen at a point designated by the positional information. On the other hand, in the case of the display apparatus disclosed in Japanese Patent Laid-Open Publication No. 72282/80, an input sheet constituted by a plurality of transparent resistance plates is disposed on a display screen of the display apparatus. When an electric pen held by an operator and driven by an alternating current is brought into contact with the input sheet, the alternating current flows into the resistance plates from the pen or stylus, whereby the alternating currents derived through the resistance plates arrayed in X- and Y-directions of orthogonal X-Y coordinate system are supplied to a stylus position detecting circuit, which in turn produces a signal representative of the coordinates (x, y) of the position of the pen contacting the input sheet. This signal is supplied to the display apparatus to be displayed on the screen at the corresponding coordinate position. When the input coordinate designating means is to be combined integrally with the display screen, there arises however a problem that the input coordinate point designated on the input panel by the operator is deviated from the output coordinate point displayed on the display screen which coincides with the designated point in appearance when viewed by the operator due to thickness of the input panel of the input coordinate designating means, the curvature of the surface of the display screen and the thickness thereof. The deviation will vary significantly in dependence on the attitude or posture of the operator. There is no proposal as to the measures for preventing such deviation. More particularly, no proposals have been yet made as to the method of making the input coordinates coincide with the output coordinates so that the input coordinates of a point designated on the input panel by the operator corresponds to the output coordinates of the point displayed on the display screen which coincides with the designated point when viewed by the operator.

SUMMARY OF THE INVENTION

An object of the present invention is to provide an input-output coordinate transforming method and apparatus which allows the input coordinates to coincide with the output coordinate in a simplified manner in an input-integrated display apparatus of a structure in which input coordinate designating means is combined integrally with a display screen.

The present invention starts from the fact that the input coordinates of a point designated by the operator on and through an input coordinate designating means of an input-integrated display apparatus are deviated from the output coordinates of the corresponding point appearing on the display screen of the display apparatus in dependence on the posture of the operator and other influential factors. It is taught by the present invention that several reference points such as the center point and four corner points are displayed on the display screen to have the operator designate the corresponding points on the input coordinate designating means which points coincide with the reference points when viewed by the operator, wherein constants of input-output coordinate transforming expressions are arithmetically determined on the basis of coordinates of the reference points and those of the input coordinates of the corresponding points designated by the operator. Subsequently, input coordinates inputted on and through the input coordinate designating means are subjected to transformation in accordance with the coordinate transforming expressions in which the arithmetically determined constants are used, to thereby be displayed as the output coordinates. Through the coordinate transformation according to the transforming expressions thus prepared, the input coordinates of a given point designated on the input coordinate designating means by the operator can be transformed into values substantially equal to the output coordinates of the point on the display screen which coincides with the designated point as viewed by the operator.

According to the invention which allows the input coordinates to coincide with the output coordinates in a simplified manner, there can be realized an input-integrated display apparatus which assures an improved man-machine communication.

BRIEF DESCRIPTION OF THE DRAWINGS

These and other objects and advantages of the present invention will become apparatus by referring to the following description taken in conjunction with the accompanying drawings, in which.

DETAILED DESCRIPTION OF THE PREFERRED EMBODIMENTS

Figure 1:
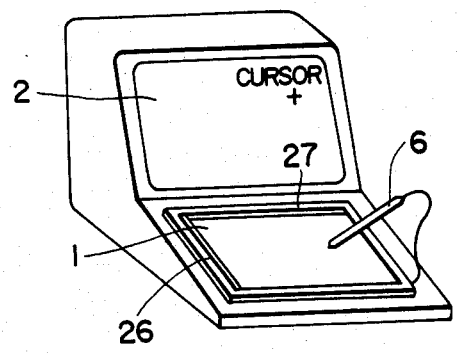
FIG. 1 is a pictorial view showing a hitherto known display device in which an input tablet is provided separately from a display section.

Referring to FIG. 1, there is shown a hitherto known input designating apparatus which comprises a combination of a tablet 1 and a display and in which the tablet 1 is disposed separately from the display screen 2. Coordinates (x, y) read along the x-direction and the y-direction by detectors 26 and 27 destined for detecting the position of a stylus pen 6 on the tablet 1, respectively, are displayed as a cursor on the display screen 2 at a corresponding position through a computer not shown. For communicating with the computer, the operator displaces the stylus pen 6 to a desired position while observing the movement of the cursor displayed on the screen. This machine interface is inconvenient for use in that the operator is requested to manually displace the stylus pen 6 which is out of the field of view of the operator when he is visually following the cursor on the display.

This disadvantage is to be solved by combining or integrating the coordinate input designating section or part with the screen of the display. However, such integration is accompanied with a problem that the output coordinates become deviated from the input coordinates as described hereinbefore.

Figure 2A:
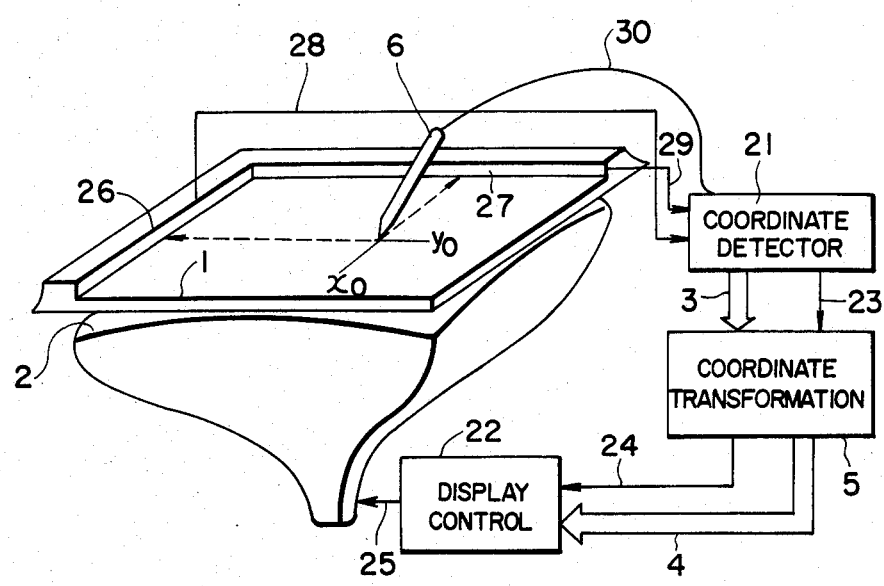
FIGS. 2a and 2b are schematic views showing a general arrangement of an input-integrated display apparatus to which the present invention is applied.

With the present invention, it is contemplated to solve the problem mentioned above. FIG. 2a shows an exemplary embodiment of the display device combined integrally with an input device (i.e. input-integral display apparatus) according to the invention. Although the display device is illustrated as composed of a CRT display, it goes without saying that the invention can be equally applied to the case where the display is constituted by a liquid crystal, plasma or the like display. It should be mentioned that although the crystal display is advantageous over the CRT display in realization of the coordinate input designating portion and the display in an integral unit, the CRT display is preferred in respect of color representation, gradation and fineness.

Figure 2B:
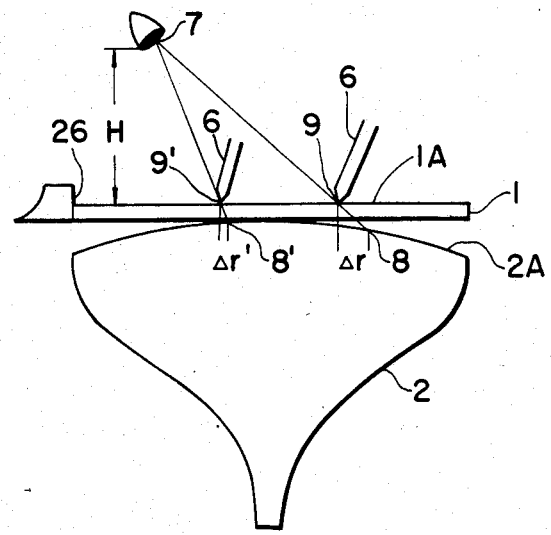

In FIG. 2a and FIG. 2b, which is a schematic side elevational view of FIG. 2a and illustrates the relationships between input points given by the input designating means and the corresponding output points displayed on the display screen, parts corresponding to those shown in FIG. 1 are denoted by like reference numerals for clarifying correspondence between them.

Referring to FIGS. 2a and 2b, the coordinate input designating means is constituted by a tablet 1, a stylus pen (hereinafter referred to simply as a pen) 6 and detectors or sensors 26 and 27 for receiving the signal emitted by the pen 6. The signals of the coordinate input designating means are supplied to a coordinate detector 21 by way of signal lines 28, 29 and 30.

Coordinate information 3 produced by the coordinate detector 21 as well as control information 23 for the coordinate information 3 are supplied to a coordinate transformation circuit 5.

Output coordinate information 4 resulting from the coordinate transformation is supplied to a display control circuit 22 together with control information 24.

The display control circuit 22 produces a signal 25 supplied to the CRT display 2 for controlling the representation of the corresponding point on the display screen 2.

In the first place, description will be made of the basic matters underlying the concept of the invention by referring to FIG. 2b.

The tablet 1 has an input surface 1A which differs from the output surface 2A of the CRT display 2. As a consequence, when the operator desires to input information corresponding to a point 8 shown in FIG. 2b on the basis of the contents displayed on the output surface 2A, the operator will designate with the pen 6 a point 9 on the input surface 1A, which point 9 is deviated from the point 8, resulting in a deviation $\Delta r$, as is seen in FIG. 2b. When the operator desires to input a point 8' displayed on the output surface 2A which differs from the point 8, he will designate with the pen 6 a point 9' on the input surface 1A, involving a deviation $\Delta r'$ between the point 8' and 9' which differs from the deviation $\Delta r$.

Although the coordinate systems on the input surface 1A and the output surface 2A are both linear, a straight line will be displayed bent significantly on the output surface 2A especially in the vicinity of the edge thereof. In other words, the output coordinate system displayed on the output surface 2A undergoes deformation in appearance when viewed by the operator, as a result of which the input coordinates are not displayed at the location designated by the pen on the output surface 2A, providing inconvenience for use, which is a disadvantage.

Difference or deviation $\Delta r$ between the points 8 and 9 can be ascribed to the facts that the tablet 1 has a thickness, the output surface 2A presents a curved plane and that the output surface 2A has a predetermined thickness. Such deviation can not be avoided by merely realizing the output surface 2A linearly so that it extends in parallel with the input surface 1A. Accordingly, the deviation $\Delta r$ will be produced more or less even when the display is constituted by a liquid crystal display in place of the CRT.

It is further noted that the deviation $\Delta r$ is more significant as the height H of the operator's eye is decreased. In other words, the deviation $\Delta r$ is influenced by personal factors such as the attitude or posture of the operator. In particular, in the case of large size display screen, the influence of such personal factor becomes significant because the observer's eye will then be positioned at a relatively more decreased height.

The invention is directed to the elimination of such inconvenience as mentioned above by providing a coordinate transformation circuit 5 which is so arranged that the designated input coordinates are coincident with the displayed output coordinates.

Referring to FIGS. 2a and 2b, the coordinates designated by the pen 6 are identified by the coordinate detector 21 on the basis of the output signals of the sensors 26 and 27 which receive ultrasonic wave emitted by the pen 6. More specifically, time of propagation is determined on the basis of a signal informing of the inputting by the pen 6 and the signals 28 and 29 informing of reception of the ultrasonic wave by the sensors 26 and 27. The detector 21 arithmetically determines the coordinates (x, y) on the basis of the propagation time thus obtained, to thereby produce the signal 3 representative of the coordinates (x, y) and the signal 23 informing of the inputting of the corrdinates (x, y), the signals 3 and 23 being supplied to the coordinate transformation circuit 5.

In the coordinate transformation circuit 5, the coordinates (x, y) of the point designated on the input surface 1A of the tablet 1 are transformed to the coordinates (X, Y) on the output surface 2A of the CRT display 2, whereby the coordinate (X, Y) information is outputted on the signal line 4 leading to the dpslay control circuit 22 together with a signal 24 indicating that the signal line 4 is validated.

The display control circuit 22 responds to the input signals to thereby control the display unit so that the point corresponding to the coordinates (X, Y) makes appearance on the screen 2.

The element which plays the important role in the operation described above is the coordinate transformation circuit 5. By the way, structures of the coordinate input designating means and the output display device are discussed in detail in "Principles Of Interactive Computer Graphics" published by McGraw Hill, chapters 11, 12, 13 and 23.

Figure 3:
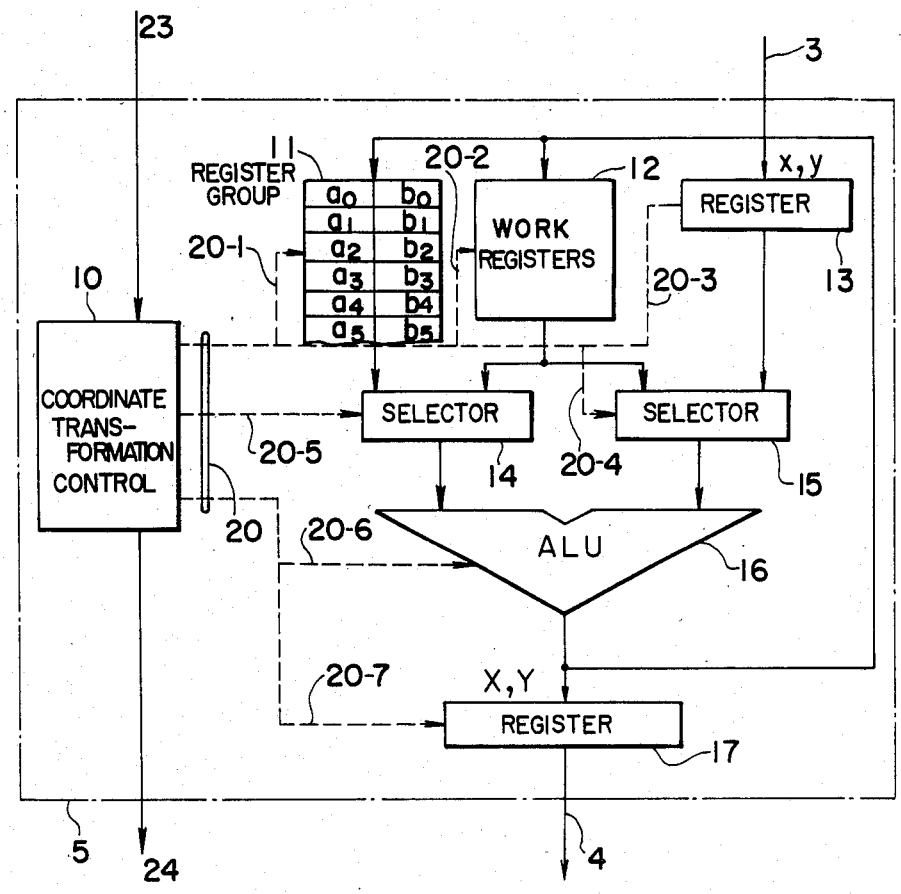
FIG. 3 is a circuit diagram of a coordinate transforming circuit according to an embodiment of the present invention.

FIG. 3 shows a circuit configuration of the coordinate transformation circuit according to an embodiment of the invention.

A coordinate transformation control circuit 10 initiates operation in response to the signal 23 to place the information 3 of the coordinates (x, y) in an input register 13. The input coordinate (x, y) information is processed in accordance with control signals supplied from the control circuit 10, to thereby be transformed to the output coordinates (X, Y) which are supplied to the display control circuit 22 (FIG. 2a) by way of the bus 4.

More specifically, the coordinate transformation device or circuit 5 transforms the input coordinates (x, y) to the output coordinates (X, Y) in accordance with following quadratic expressions:

$$X = a_0 + a_1 x + a_2 y + a_3 x^2 + a_4 y^2 + a_5 yx \quad (1)$$

$$Y = b_0 + b_1 x + b_2 y + b_3 x^2 + b_4 y^2 + b_5 xy \quad (2)$$

where $a_0$ to $a_5$ and $b_0$ to $b_5$ represent constants.

To realize the above expressions, the coordinate transformation device or circuit 5 includes a group of registers 11 for storing the constants $a_0$ to $a_5$ and $b_0$ to $b_5$, a group of work registers 12 for storing temporarily interim results of arithmetic operations, an arithmetic unit 16 capable of performing arithmetic operations inclusive of multiplication, selectors 14 and 15 for selecting right and left inputs to the arithmetic unit 16, and the control circuit 10 for producing control signals 20 supplied to the components mentioned above.

Figure 4:
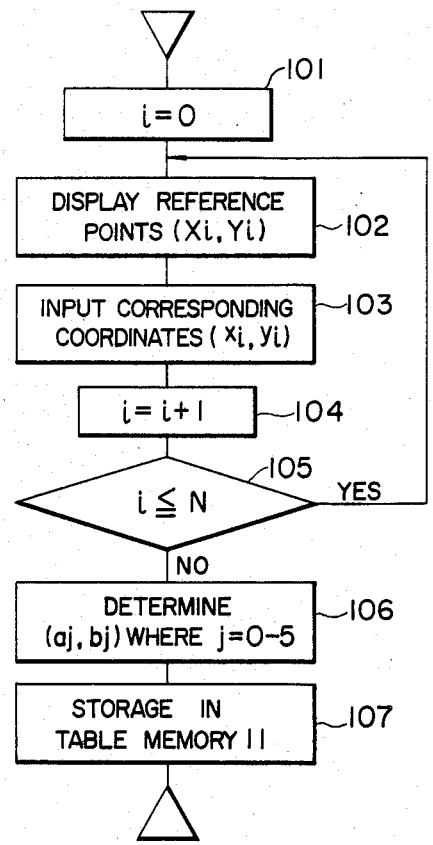
FIG. 4 shows a flow chart for illustrating an example of the procedure for determining constants of expressions for coordinate transformation.

In order to transform the designated input coordinates (x, y) to the output coordinates (X, Y) to be displayed through the coordinate transformation circuit 5 of the configuration mentioned above, it is necessary to determine the constants $a_0, \ldots, a_5$ and $b_0, \ldots, b_5$. A procedure for this determination will be explained by referring to a flow chart shown in FIG. 4.

At a step 101, an affix i is set to zero. At a step 102, a point corresponding to the coordinates $(X_0, Y_0)$ of a predetermined reference point, e.g. the center point of the output surface 2A of the display 2 is displayed on the output surface 2A. At a step 103, operator inputs the coordinates $(x_0, y_0)$ of a point on the input surface 1A which coincides with the displayed point of the coordinates $(X_0, Y_0)$ when viewed by the operator. At a step 104, the affix i is incremented to $i+1$ and compared with a predetermined number N at a step 105. When i is smaller than N or equal to N, the step 102 is regained, and a point corresponding to the coordinates $(X_1, Y_1)$ of a succeeding reference point, e.g. one of four corner points on the output surface 2A is displayed, to have the operator input the coordinates $(x_1, y_1)$ corresponding to the coordinates $(X_1, Y_1)$ at the step 103. As the reference points $(X_i, y_i)$, it is preferred to select the center point and four corner points on the output surface 2A and/or given interpolating points. Through the routine of the steps 101 to 105, $(N+1)$ reference points are outputted to thereby allow the operator to input the coordinates $(x_i, y_i)$ which correspond to the coordinates $(X_i, Y_i)$ of the reference points. Inputting of the coordinates of the points corresponding to the reference points by the operator is informed to the coordinate transformation circuit 5 by the signal 23 on a point-by-point basis. When i is greater than N, the procedure proceeds from the step 105 to a step 106 where the constants $a_j$ and $b_j$ $(0 = 1, \ldots, 5)$ of the expressions (1) and (2) are arithmetically determined on the basis of the coordinates $(X_i, Y_i)$ and $(x_i, y_i)$ The constants $a_j$ and $b_j$ determined arithmetically are stored in a table memory constituting a temporary storage means at a step 107.

Next, calculation of the constants $a_j$ and $b_j$ which is executed at the step 106 will be described. When the coordinates $(X_i, Y_i)$ of the reference points and the corresponding input coordinates $(x_i, y_i)$ are placed in the expressions (1) and (2), there apply valid the following simultaneous equations:

$$\left. \begin{array}{l} X_0 = a_0 + a_1 x_0 + a_2 y_0 + a_3 x_0^2 + a_4 y_0^2 + a_5 x_0 y_0 \\ X_1 = a_0 + a_1 x_1 + a_2 y_1 + a_3 x_1^2 + a_4 y_1^2 + a_5 x_1 y_1 \\ X_2 = a_0 + a_1 x_2 + a_2 y_2 + a_3 x_2^2 + a_4 y_2^2 + a_5 x_2 y_2 \\ X_3 = a_0 + a_1 x_3 + a_2 y_3 + a_3 x_3^2 + a_4 y_3^2 + a_5 x_3 y_3 \\ X_4 + a_0 + a_1 x_4 + a_2 y_4 + a_3 x_4^2 + a_4 y_4^2 + a_5 x_4 y_4 \\ X_5 = a_0 + a_1 x_5 + a_2 y_5 + a_3 x_5^2 + a_4 y_5^2 + a_5 x_5 y_5 \end{array} \right\} \quad (3)$$

$$\left. \begin{array}{l} y_0 = b_0 + b_1 x_0 + b_2 y_0 + b_3 x_0^2 + b_4 y_0^2 + b_5 x_0 y_0 \\ Y_1 = b_0 + b_1 x_1 + b_2 y_1 + b_3 x_1^2 + b_4 y_1^2 + b_5 x_1 y_1 \\ Y_2 = b_0 + b_1 x_2 + b_2 y_2 + b_3 x_2^2 + b_4 y_2^2 + b_5 x_2 y_2 \\ Y_3 = b_0 + b_1 x_3 + b_2 y_3 + b_3 x_3^2 + b_4 y_3^2 + b_5 x_3 y_3 \\ Y_4 = b_0 + b_1 x_4 + b_2 y_4 + b_3 x_4^2 + b_4 y_4^2 + b_5 x_4 y_4 \\ Y_5 = b_0 + b_1 x_5 + b_2 y_5 + b_2 x_5^2 + b_4 y_5^2 + b_5 x_5 y_5 \end{array} \right\} \quad (4)$$

The expressions (3) are the simultaneous linear equations for the constants $a_0, \ldots, a_5$. The values of these constants $a_0, \ldots, a_5$ can be determined by solving the above equations (3) which can be solved provided that i is greater than 5, i.e. six or more points are available for the coordinates $(x_i, y_i)$ and $(X_i, Y_i)$. Further, by selecting i so as to be greater than six, it is possible to determine the combinations of the constants $a_0, \ldots, a_5$ which allow the input error involved in the inputting to be more reduced.

Same holds true for the determination of the constants $b_0, \ldots, b_5$ in accordance with the expressions (4).

Execution of the above mentioned control by the coordinate transformation device 5 of the circuit configuration shown in FIG. 3 can be readily accomplished provided that the control circuit 10 is constituted by a microprogram-controlled device. To this end, the processing mentioned below, for example, may be executed.

At first, the control circuit 10 places the predetermined coordinate values $(X_0, Y_0)$ in a register 17 for the output coordinates. This information is transferred to the display control circuit 22, whereby the point defined by the coordinates $(X_0, Y_0)$ is displayed on the screen 2A. Accordingly, the operator inputs a corresponding point $(x_0, y_0)$ on the tablet 1 by designating the point with his pen. Since the inputting of the point $(x_0, y_0)$ is informed to the control circuit 10 by way of the control signal line 23, the coordinate input information $(x_0, y_0)$ on the signal line 3 is read into the coordinate transformation circuit or device 5 to be loaded in the register 13. The coordinate information $(x_0, y_0)$ is transferred from the register 13 to the work register group 12 through the selector 15 and the arithmetic unit 16. Further, the coordinate information $(X_0, Y_0)$ is also transferred to the work register group 12 from the control circuit 10. The processing mentioned above is repeated for $(X_1, Y_1)$ et seq. by the control circuit 10 more than five times, all the resulting data being copied by the work registers 12. Subsequently, the constants $a_0, \ldots, a_5$ and $b_0, \ldots, b_5$ are determined on the basis of the contents in the work registers 12 and written in the register group 11 at corresponding locations.

Various methods are conceivable for determining the constants $a_0, \ldots, a_5$ and $b_0, \ldots, b_5$ on the basis of the correspondences between the coordinates $(X_i, Y_i)$ and $(x_i, y_i)$. Among them, the below mentioned matrix-based calculation may be mentioned as the simplest method.

$$a_0 = \frac{\begin{vmatrix} X_0 & x_0 y_0 & x_0^2 & y_0^2 & x_0 y_0 \\ X_1 & x_1 y_1 & x_1^2 & y_1^2 & x_1 y_1 \\ X_2 & x_2 y_2 & x_2^2 & y_2^2 & x_2 y_2 \\ X_3 & x_3 y_3 & x_3^2 & y_3^2 & x_3 y_3 \\ X_4 & x_4 y_4 & x_4^2 & y_4^2 & x_4 y_4 \\ X_5 & x_5 y_5 & x_5^2 & y_5^2 & x_5 y_5 \end{vmatrix}}{\begin{vmatrix} 1 & x_0 y_0 & x_0^2 & y_0^2 & x_0 y_0 \\ 1 & x_1 y_1 & x_1^2 & y_1^2 & x_1 y_1 \\ 1 & x_2 y_2 & x_2^2 & y_2^2 & x_2 y_2 \\ 1 & x_3 y_3 & x_3^2 & y_3^2 & x_3 y_3 \\ 1 & x_4 y_4 & x_4^2 & y_4^2 & x_4 y_4 \\ 1 & x_5 y_5 & x_5^2 & y_5^2 & x_5 y_5 \end{vmatrix}}$$

The above determinant may be solved through sequential calculations performed by hardware including the register group 11, the work register group 12, the selectors 14 and 15 and the arithmetic unit 16 operated under the commands issued by the control circuit 10. Such calculations can be readily realized in view of the recent progress in the microprogram control.

Figure 5:
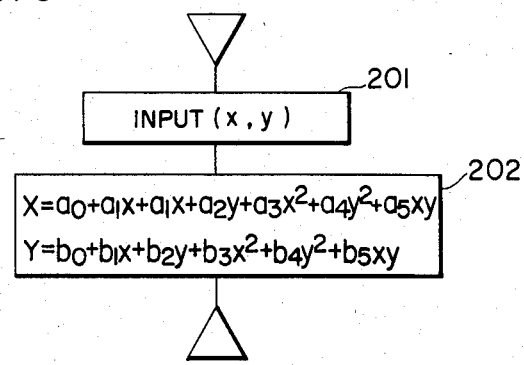
FIG. 5 is a view showing a flow chart for illustrating the procedure of coordinate transformation, by way of example.

When the constants $a_0, \ldots, a_5$ and $b_0, \ldots, b_5$ determined in this way have been placed in the group of registers 11, the coordinate transformation from the coordinate (x, y) of the point inputted by the operator on the input face 1A into the coordinates (X, Y) of the point to be displayed on the output surface 2A is carried out by receiving the coordinate information (x, y) of the point inputted at a step 201 and determining the coordinates (X, Y) on the basis of the calculated constants $a_0, \ldots, a_5$ and $b_0, \ldots, b_5$ in accordance with the espressions (1) and (2) at a step 202, as is shown in FIG. 5, whereby the point defined by the coordinates (X, Y) is displayed on the output surface 2A.

Arithmetic determination of the coordinates (X, Y) may be readily accomplished with the aid of the circuit shown in FIG. 3, an example of which will be mentioned below. In case the coordinate X is determined from a pair of the coordinates (x, y), the constant $a_3$ may be outputted from the register group or set 11 in response to the control signal 20 of the control circuit 10 and supplied to the lefthand input of the arithmetic unit 16 while x is selected as the righthand input to the arithmetic unit 16. The function of the latter is set to multiplication mode, the result of which is placed in one (WK) of the work registers 12. Then, the contents of that work register is represented by $$WK = a_3 X x$$

At the next step, the content WK is supplied to the right-hand input of the arithmetic unit 16 while $a_1$ being selected as the lefthand input of the unit 16 which is set to the addition mode at this time. The result of computation placed in the work register is given by $$WK = a_1 + a_3 X x.$$

Next, the content WK is supplied to the lefthand input of the arithmetic unit 16 with x being applied to the righthand input, and calculation is effected in accordance with $$WK = a_1 x + a_3 x^2$$

Similarly for another work register $WK_1$, $$WK_1 = a_2 y + a_4 y^2$$

By supplying WK to the righthand input with $a_0$ being applied to the lefthand input, $$WK = a_0 + a_1 x + a_3 x^2$$

Further, supplying WK to the lefthand input with $WK_1$ to the righthand input, $$WK = a_0 + a_1 x + a_3 x^2 + a_2 y + a_4 y^2$$

The result of the calculation is placed in the register 17 on the side X. Through calculation of $WK = a_5$, $$X = WK + WK_1$$

Thus, the coordinate X is determined. The coordinate Y may be determined through similar procedure.

As will be appreciated from the foregoing, the constants $a_0, \ldots, a_5$ and $b_0, \ldots, b_5$ determined once may be utilized for making the input coordinates coincide with the output coordinates.

The invention has been described on the assumption that the CRT display is integrally combined with an ultrasonic tablet. It will, however, be appreciated that the invention may equally be applied to the apparatus in which magnetic or elastic wave or write pen is employed as the inputting or writing means while a flat display such as liquid crystal, plasma, EL or the like display is employed as the output means.

Concerning the coordinate transformation, the quadratic expressions have been considered. However, similar procedure may be adopted to deal with the expressions which include cubic terms.

We claim:

1. An input-output coordinate transforming method for an input-integrated display apparatus having a structure in which an input coordinate designating means is physically connected with a screen of a display device and is integrally combined therewith, wherein coordinates inputted through said input coordinate designating means by an operator are subjected to coordinate transformation before being supplied to said display device so as to make an output point on said display coincide with a corresponding input point on said input coordinate designating means when viewed by the operator, comprising the steps of:

displaying a plurality of predetermined reference coordinate points on said display screen and inputting through said input coordinate designating means the coordinates of points thereon designated by the operator, said points being designated such that they coincide with said reference coordinate points, respectively, when viewed by the operator;

arithmetically determining constants of predetermined coordinate transformation expressions representing correspondence between the input coordinates and the output coordinates on the basis of said plurality of coordinates of said displayed reference coordinate points and said plurality of coordinates of said points designated by the operator; and transforming the input coordinates inputted through said input coordinate designating means into output coordinates which are supplied to said display device by using said coordinate transformation expressions which contain said determined constants.

2. An input-output coordinate transforming method according to claim 1, wherein said coordinate transformation is expressed in a quadratic form.

3. An input-output coordinate transforming method according to claim 1, wherein said plurality of the reference coordinates are those of a center point and four corner points of the display screen when said display screen is of a substantially rectangular form.

4. An input-integrated display apparatus, comprising:

a display device including display means and a display control circuit for supplying to said display means a display control signal for displaying a point in accordance with input signals representative of coordinates of said point to be displayed through said display means;

input coordinate designating means including a tablet on which the point to be displayed is designated by an operator, said tablet being physically connected with a display screen of said display means and integrally combined therewith, said coordinate input designating means including means for supplying coordinate signals representative of coordinates of the point designated by the operator in response to the designation of said point; and coordinate transformation means for converting the coordinates represented by the input coordinate signals supplied from said input coordinate designating means into corresponding coordinates on a display screen of said display means, and for supplying signals representative of transformed coordinates to said display device, said coordinate transformation means including input register means for storing the input coordinate information supplied from said input coordiante designating means, temporal storage means for temporary storage of data, output register means for storing the coordinate information to be supplied to said display means, and a control circuit, wherein said control circuit includes:

means for loading coordinate information of a plurality of predetermined reference coordinates in said output register means sequentially and supplying the loaded information to said display device, means for receiving sequentially from said input coordinate designating means through said input register means the information of coordinates of points on said tablet in response to designations of the operator, said points being designated such that each of said points coincide with each of the reference points on said display device having said reference coordinates as viewed by the operator, means for calculating constants of predetermined coordinate transforming expressions on the basis of said plurality of the reference coordinates and the corresponding coordinates from said input coordinate designating means and for storing the calculated constants in said temporal storage means, and means for subsequently transforming coordinates included in information loaded in said input register means from said input coordinate designating means by using coordinate transforming expressions in which said constants stored in said temporal storage means are employed, and for loading information as to the transformed coordinates in said output register means.

5. An input-integrated display apparatus according to claim 4, wherein said coordinate transforming expressions are given in a quadratic form.

6. An input-integrated display apparatus according to claim 4, wherein said plurality of the reference coordinates are those of a center point and four corner points of the display screen when said display screen is of a rectangular form.

* * * * *